(12) United States Patent
Leung et al.

(10) Patent No.: US 9,178,868 B1
(45) Date of Patent: Nov. 3, 2015

(54) PERSISTENT LOGIN SUPPORT IN A HYBRID APPLICATION WITH MULTILOGIN AND PUSH NOTIFICATIONS

(71) Applicant: Google Inc., Mountain View, CA (US)

(72) Inventors: Dominic King Hay Leung, Thornhill (CA); Donna Chantelle Dupuis, Waterloo (CA)

(73) Assignee: Google Inc., Mountain View, CA (US)

( * ) Notice: Subject to any disclaimer, the term of this patent is extended or adjusted under 35 U.S.C. 154(b) by 22 days.

(21) Appl. No.: 13/924,955

(22) Filed: Jun. 24, 2013

(51) Int. Cl.
*H04L 29/06* (2006.01)
(52) U.S. Cl.
CPC .................................. *H04L 63/0815* (2013.01)
(58) Field of Classification Search
CPC .................................................. H04L 63/0815
USPC ........... 713/159, 172; 705/65, 66; 726/2, 4, 5, 726/8, 9, 10
See application file for complete search history.

(56) References Cited

U.S. PATENT DOCUMENTS

| | | | | |
|---|---|---|---|---|
| 7,240,192 | B1 * | 7/2007 | Paya et al. ...................... | 713/152 |
| 7,318,234 | B1 * | 1/2008 | Dharmarajan .................... | 726/2 |
| 7,356,694 | B2 * | 4/2008 | Mayo et al. ..................... | 713/159 |
| 8,473,749 | B1 * | 6/2013 | Madsen et al. ................. | 713/187 |
| 8,607,306 | B1 * | 12/2013 | Bridge et al. ..................... | 726/1 |
| 8,626,865 | B1 * | 1/2014 | Phillips et al. ................. | 709/213 |
| 8,667,579 | B2 * | 3/2014 | Leeder ............................. | 726/20 |
| 2007/0174905 | A1 * | 7/2007 | Martherus et al. ................ | 726/8 |
| 2009/0094688 | A1 * | 4/2009 | Roy ................................... | 726/7 |
| 2010/0306547 | A1 * | 12/2010 | Fallows et al. ................ | 713/178 |
| 2011/0047372 | A1 | 2/2011 | Ganesan | |
| 2012/0060210 | A1 * | 3/2012 | Baker et al. ........................ | 726/9 |
| 2012/0072979 | A1 | 3/2012 | Cha et al. | |
| 2014/0075513 | A1 * | 3/2014 | Trammel et al. .................. | 726/4 |
| 2014/0173695 | A1 * | 6/2014 | Valdivia ............................. | 726/4 |

FOREIGN PATENT DOCUMENTS

CN 101699889 4/2010

OTHER PUBLICATIONS http://tools.ietf.org/html/draft-ietf-oauth-v2-28 as archived Jun. 23, 2012 at http://web.archive.org.*
Hardt,"The OAuth 2.0 Authorization Framework", Microsoft, Internet Engineering Task Force (IETF), ISSN: 2070-1721, 53 pages, Oct. 2012.

* cited by examiner

*Primary Examiner* — Saleh Najjar
*Assistant Examiner* — Oleg Korsak
(74) *Attorney, Agent, or Firm* — Morris & Kamlay LLP

(57) ABSTRACT

A system and method are disclosed that may allow a hybrid application to support persistent login, multilogin, and push notifications. User credentials may be received and utilized to obtain an access token and a refresh token. The refresh token may be stored to persistent storage and the access token may be used to obtain a browser authentication cookie from an authentication server. The web application portion of a hybrid application may be authenticated using the browser authentication cookie.

26 Claims, 4 Drawing Sheets

PERSISTENT LOGIN SUPPORT IN A HYBRID APPLICATION WITH MULTILOGIN AND PUSH NOTIFICATIONS

BACKGROUND

Applications often make use of cookies to store and/or retrieve information about the user and/or the application itself (e.g., resources needed to operate or update the application). For example, a cookie is commonly utilized to establish user credentials on a web site or application. A user may enter login information such as a user name and password. The login information may be verified by an authentication server and, if valid, the server may send one or more cookies to the user. The cookie may contain the user's credentials or an indication that the user's credentials are valid. Each page a user visits on a site may check the cookie to determine the user's identity or to verify the user's presence on the site. In most cases, the cookie is set to expire upon a user closing the browser or application. Cookies are employed on mobile devices, such as smartphones, as a part of applications that may be installed on the devices. Due to different mobile operating systems, some applications contain a web application which may complicate authentication of the application and create a subpar user experience.

BRIEF SUMMARY

According to an implementation of the disclosed subject matter, at least one user credential for a first user may be received. An access token and a refresh token may be requested from an authentication server using the at least one user credential from the first user. The refresh token may be stored in persistent storage, thereby causing the refresh token to persist in a secure manner. A request to the authentication server may be issued to exchange the access token for a browser authentication cookie. The access token may be exchanged for the browser authentication cookie. An application-specific cookie may be obtained using the browser authentication cookie. A web application portion of a hybrid application may be authenticated using the browser authentication cookie.

In an implementation, a first user credential for a first user account may be received. An access token and a refresh token may be obtained using the first user credential. The refresh token may be stored to persistent storage. The access token may be provided to an authentication server. In response to providing the access token, a browser authentication cookie may be received. A web application portion of a hybrid application may be authenticated using the browser authentication cookie.

A system disclosed that includes storage module and a processor connected to the storage module. The storage module may store a browser authentication cookie, for example. The processor may be configured to receive a first user credential for a first user and obtain an access token and a refresh token using the first user credential. It may store the refresh token to a persistent storage module, which may be a component of the storage module or entirely separate from it. The processor may be configured to exchange the access token for a browser authentication cookie and authenticate a web application portion of a hybrid application using the browser application cookie.

The disclosed system and method may allow a hybrid application to support persistent log in and multilogin capabilities. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Figure 1:
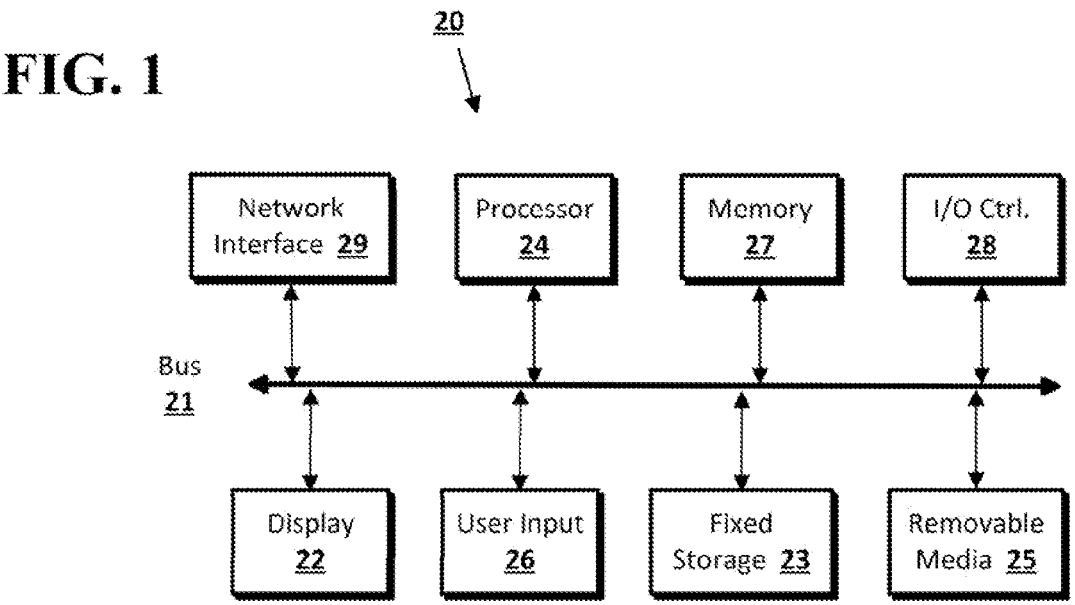
FIG. 1 shows a computer according to an implementation of the disclosed subject matter.

Typically, once a user enters credentials, the user may receive an access token which has an expiry (e.g., two weeks) and a refresh token which never expires. Access tokens may be used to express an authenticated state to a server and are safe to transmit over a network. Thus, they can support push notifications. Once an access token expires, a refresh token may be utilized to fetch a new access token. Thus, the user may be logged in for an unlimited period of time or until the user's authentication is revoked explicitly. When a new account is added, a separate access token may be received such that there is a 1:1 mapping between access token and account. Each access token may be independent of any other. This configuration may be sufficient for persistent login, push notifications, and multilogin where it is not necessary to authenticate a browser within an application. However, access tokens alone cannot authenticate a web application portion of a hybrid application.

A hybrid application may refer to a native application that wraps and/or contains a web application. It is typically utilized because the web code can be refreshed or updated frequently and the web code may be reused for different clients (e.g., mobile devices such as a laptop, smartphone, tablet, etc.). Hybrid application authentication can be difficult because the browser component may utilize cookies to authenticate and the cookie session can expire. If the cookie session expires, the user would need to re-enter the user's credentials in order to receive a new authentication cookie. This creates a poor user experience and may not support persistent login. Further, push notifications may require persistent login in addition to sending the authenticated state to some notifications server in order to register/deregister users for the push notification service. But, as stated earlier, authentication cookies cannot be sent over a network for this purpose for security reasons. Lastly, using authentication cookies complicates support of multilogin (e.g., multiple accounts simultaneously signed into an application) because authentication cookies support multilogin in a way that may not be compatible with a hybrid application.

Implementations disclosed herein provide a way to integrate an authentication protocol and browser authentication cookies on a client for supporting persistent login and multilogin in a hybrid application or operating system. An authentication protocol may allow a user to grant access to private resources owned or controlled by a user on one site (e.g., a service provider) to another site (e.g., a consumer that is not the user). It may allow access to a user's resources without sharing the identity of the user (or protected information about the user). Multilogin may refer to an instance where a single user has multiple user accounts for the same application (e.g., an email application) or where multiple users each have a user account and utilize the same application on the same device. Persistent login may refer to an instance where a user is constantly logged into an application until the user is explicitly logged out. Multilogin and persistent login (e.g., where a user is remains logged into an application) may be supported with a cookie if the cookie session never expires. However, providing an authentication cookie session that does not expire for a web application may be undesirable. It may make a user's device or credentials vulnerable. For example, the non-expiring cookie may be utilized by a person who is not the original user or for whom the credentials are invalid. Because the cookie never expires, the original user would not need to enter credentials again nor would anyone else who acquired the cookie.

Multilogin in the web may utilize a single cookie that contains the authentication information of all the logged-in sessions; however, these cookies cannot be easily manipulated or parsed on the client side (e.g., because they may be encrypted). Thus, the sessions are coupled. Even if the sessions never expired, the cookies could not be utilized to support push notifications since authentication cookies are not sent over a network for security reasons.

Briefly, the disclosed process includes signing into a single account such as by obtaining a username and/or password for the account. The user credentials may be used to obtain authentication tokens, such as an access token and/or a refresh token, for the desired service by making a request to an authentication server. The refresh token may be stored in persistent storage so that it persists in a secure manner. A request may be issued to the authentication server to exchange an access token for a browser authentication cookie for the service to which the authentication tokens are scoped. These authentication cookies may be used for authenticating the web application portion of a hybrid application.

The authentication cookies may be used to fetch any other application-specific cookies. An example of how this may be done is loading the application by querying the web application server in a browser. When an authentication cookie expires, the above steps may be repeated to obtain a new authentication cookie. When an access token expires, a request may be made to the authentication server to obtain a new access token using the refresh token (which persists and never expires), according to the authentication protocol. The application may be loaded any time after the request to exchange the access token for browser authentication cookies. When an authentication cookie session expires, the access token corresponding to the expired session may be used to refresh that session. For example, the expired session may be refreshed by providing the access token corresponding to the expired cookie session to the authentication server, at which point the authentication server may provide a new cookie. Thus, an access token may be used to refresh an expired cookie session. If the access token has expired, however, it can be refreshed using the refresh token. The refreshed access token may then be utilized to refresh the cookie session. As disclosed herein the access token and/or the refresh token may be traded for one or more cookies to support persistent login for a hybrid application.

To provide multilogin support, a second account may be added as well, by following substantially the same procedure for a single account. However, after using the authentication cookies to fetch any other application-specific cookies, the new cookie sessions may be merged into the existing authentication cookies (e.g., the first user's cookies must be present in a shared application cookie jar) as described below. A shared application cookie jar may refer to a location or folder in which one or more cookies from one or more applications may be stored. In the case of multilogin support, the authentication server may be directed to combine or merge a new session with the existing authentication information in the cookie storage. In some instances, the device or client from or for which authentication is sought may direct the authentication server to merge a session while in other instances the authentication server may perform the merging of a session in a cookie ad hoc as described below. The merged cookie may be provided to the device or client and stored.

Since the user does not need to re-enter their credentials to refresh cookies that authenticate the web application component, persistent login is provided, and push notifications are likewise supported via the authentication protocol access tokens. Multilogin is supported by use of merging sessions into the authentication cookies. Also, the use of merged sessions in the authentication cookies permits usage of multiple active browsers, one per logged-in account, which may have a performance advantage.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
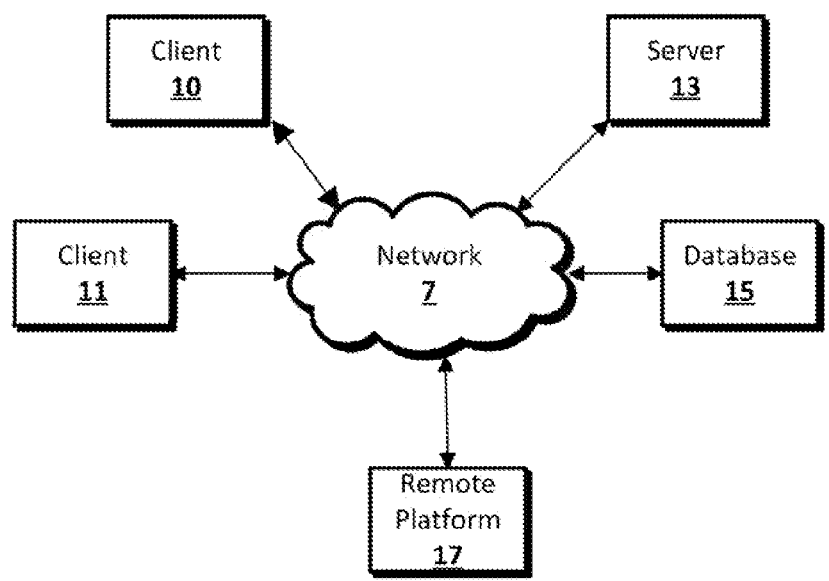
FIG. 2 shows a network configuration according to an implementation of the disclosed subject matter.
Figure 3:
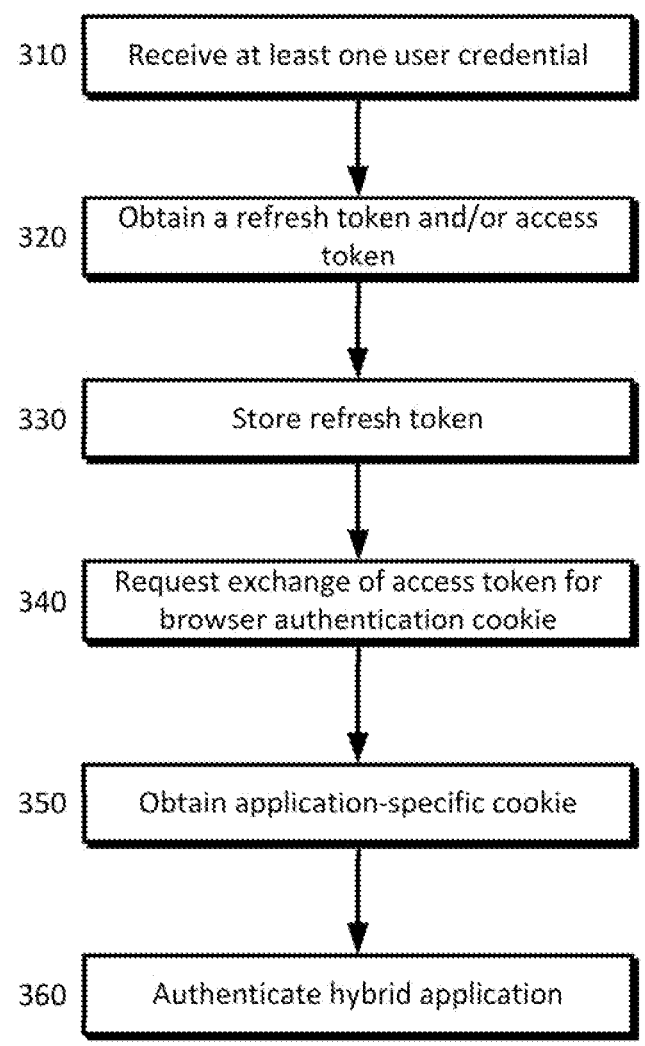
FIG. 3 is an example process of authenticating a hybrid application according to an implementation disclosed herein.
Figure 4:
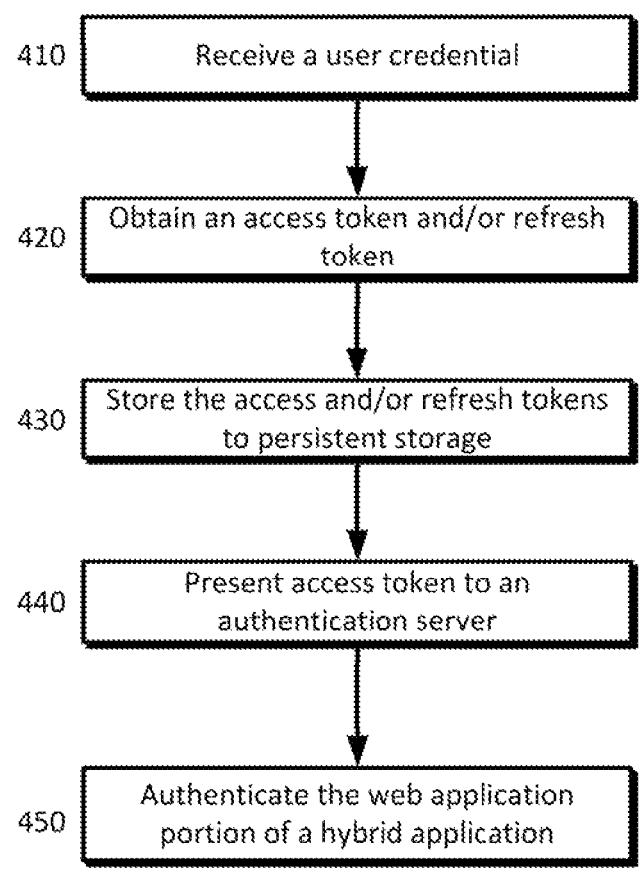
FIG. 4 is an example process of authenticating a hybrid application according to an implementation disclosed herein.
Figure 5:
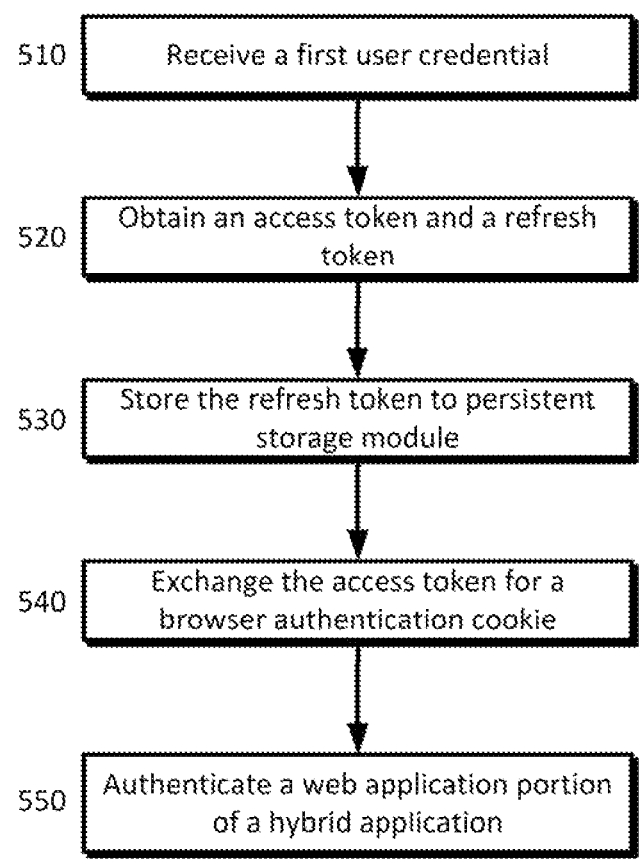
FIG. 5 is an example of a system for authenticating a hybrid application according to an implementation disclosed herein.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In an implementation, at least one user credential may be received for a first user at 310. A user credential may be, for example, a username and/or a password. The user credential may be received, for example, by a server (e.g., an authentication server). For example, a user may activate an email application on the user's smartphone. The application may request the user to enter the appropriate username (e.g., a handle that corresponds to the user's email address or the actual address) and a password for the user's email account.

An access token and a refresh token may be requested from an authentication server using the at least one credential from the first user at 320. The access token and the refresh token may be simultaneously or separately requested (and/or obtained). The refresh token may be stored to persistent storage causing the refresh token to persist in a secure manner at 330. Persistent storage may refer to a computer readable medium that allows the refresh token to persist even after an application that, for example, was used to obtain the refresh token is closed. Persisting in a secure manner may refer to a portion of computer readable medium that cannot be accessed (e.g., read, write, delete) until the device associated with the medium is unlocked and may preclude access to a file or data except by the application that placed the file or data there in the first place (which also may require authentication of the service or application to determine if it placed the file or data there). Thus, a token stored to the persistent storage may persist in a secure manner because access to the persistent storage cannot occur until a device (e.g., a smartphone) is unlocked and/or an application that put the token there attempts to access it.

A request to the authentication server may be issued to exchange the access token for a browser authentication cookie at 340. The access token may be exchanged for the browser authentication cookie. Exchange may not be a permanent exchange, that is, the access token may be provided or presented to the authentication server which may, upon authenticating the access token, provide the browser authentication cookie in response. The access token may be retained by the device from which the request is issued. In some configurations, an application-specific cookie may be obtained using the browser authentication cookie at 350. For example, if the hybrid application is a video game, an application-specific cookie may be one that stores the user's progress and/or achievements in the game. A web application portion of a hybrid application may be authenticated using the browser authentication cookie at 360.

In an implementation, a first user credential (e.g., a user name and/or password) may be received for a first user account at 410. An access token and a refresh token may be obtained using the first user credential at 420. The tokens may be independently or simultaneously obtained. A request may be made for the one or both tokens from an authentication server (i.e., the request may be made to the authentication server for a token). In some configurations, one or both of the tokens may be scoped to a particular service. For example, a token may have a scope that allows access to a particular resource, application programming interface ("API"), uniform resource locator ("URL"), etc. The received one or more tokens may be stored to persistent storage as disclosed earlier at 430. The access token may be provided or presented to an authentication server at 440. A browser authentication cookie may be provided in response to presentation of the access token. In some instances, an application-specific cookie may be obtained using the browser authentication cookie. A web application portion of a hybrid application may be authenticated using the browser authentication cookie at 450.

The browser authentication cookie may have an expiry date and/or time. The expiry for the browser authentication cookie may be determined and a second or new browser authentication cookie may be obtained using the access token. Again, an application-specific cookie may be obtained using the access token and/or the refresh token if necessary. Similarly, the access token may have an expiry that may be determined. A request may be made to the authentication server to provide a second access token using the refresh token.

In an implementation, a second user credential from a second user account may be received. A second access token and a second refresh token may be obtained using the second user credential for the second user. The second refresh token may be stored to persistent storage. For example, it may be added to a folder or library of refresh tokens (e.g., that may include the first refresh token). The second access token may be exchanged for a second browser authentication cookie as described earlier. The web application portion of the hybrid application may be authenticated using the second browser authentication cookie. The browser authentication cookie may be merged with the second browser authentication cookie. The merged browser authentication cookie may be represented as multiple sessions merged into one cookie. For example, a first user's credentials or identification, a time stamp, and cookie scope may be encrypted and stored to a cookie. Similar data for a second user may be obtained and likewise encrypted. The second user's data may be merged into the same cookie as the first user's data by, for example, a hashing algorithm. The algorithm may combine multiple data payloads for each user. Upon a request to a service (e.g., an email server), the user making the request may be determined or checked and the data payload corresponding to that user (based on a hash associated with the user) may be decrypted. For example, the hash algorithm may be used to determine the user identifications in the merged cookie and only data corresponding to the user making the request may be decrypted and used for authentication. In this manner, only a single authenticated session may be active at a time.

In an implementation, a system is provided that includes a storage module and a processor. The storage module may store a browser authentication cookie. The processor may be configured to receive a first user credential for a first user at 510. It may obtain an access token and a refresh token using the first user credential at 520 and store the refresh token to a persistent storage module at 530. The processor may be configured to exchange the access token for a browser authentication cookie at 540. A web application portion of a hybrid application may be authenticated using the browser application cookie at 550.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
receiving at least one user credential for a first user;
requesting, from an authentication server, an access token and a refresh token using the at least one user credential from the first user;
storing the refresh token to persistent storage causing the refresh token to persist in a secure manner;
issuing a request to the authentication server to exchange the access token for a browser authentication cookie;
obtaining an application-specific cookie using the browser authentication cookie, the application-specific cookie configured to store information related to a hybrid application, the hybrid application being a native application that wraps or contains a web application; and
authenticating a web application portion of the hybrid application using the browser authentication cookie.

2. The method of claim 1, further comprising:
determining that the access token has expired;
providing the refresh token to the authentication server; and
obtaining a second access token.

3. A computer-implemented method, comprising:
receiving a first user credential for a first user account;
obtaining an access token and a refresh token using the first user credential;
storing the refresh token to persistent storage;
providing the access token to an authentication server, wherein the access token is used to obtain a browser authentication cookie; and
authenticating a web application portion of a hybrid application using the browser authentication cookie, the hybrid application being a native application that wraps or contains a web application.

4. The method of claim 3, wherein the first user credential comprises a user name and a password.

5. The method of claim 3, further comprising requesting, from the authentication server, at least one token selected from the group consisting of: the access token and the refresh token.

6. The method of claim 5, wherein the at least one token is scoped to a particular service.

7. The method of claim 3, wherein storage of the refresh token to the persistent storage causes it to persist in a secure manner.

8. The method of claim 3, further comprising obtaining an application-specific cookie using the browser authentication cookie, the application-specific cookie configured to store information related to the hybrid application.

9. The method of claim 3, further comprising determining that the browser authentication cookie has expired.

10. The method of claim 9, further comprising:
based on the determination that the browser authentication cookie has expired, obtaining a second browser authentication cookie using the access token; and
obtaining an application-specific cookie using the access token, the refresh token, or both the access token and the refresh token, the application-specific cookie configured to store information related to the hybrid application.

11. The method of claim 3, further comprising determining that the access token has expired.

12. The method of claim 11, further comprising requesting, from the authentication server, a second access token using the refresh token.

13. The method of claim 3, further comprising:
receiving a second user credential from a second user account;
obtaining a second access token and a second refresh token using the second user credential for the second user;
storing the second refresh token to the persistent storage;
exchanging the second access token for a second browser authentication cookie;
authenticating the web application portion of the hybrid application using the second browser authentication cookie; and
merging the browser authentication cookie with the second browser authentication cookie.

14. The method of claim 3, further comprising:
determining that the access token has expired;
providing the refresh token to the authentication server; and
obtaining a second access token.

15. A system comprising:
a storage module, for storing a browser authentication cookie; and
a processor connected to the storage module, the processor configured to:
receive a first user credential for a first user;
obtain an access token and a refresh token using the first user credential;
store the refresh token to a persistent storage module;
exchange the access token for a browser authentication cookie; and
authenticate a web application portion of a hybrid application using the browser application cookie, the hybrid application being a native application that wraps or contains a web application.

16. The system of claim 15, wherein the first user credential comprises a user name and a password.

17. The system of claim 15, wherein the processor is further configured to request, from the authentication server, at least one token selected from the group consisting of: the access token and the refresh token.

18. The system of claim 17, wherein the at least one token is scoped to a particular service.

19. The system of claim 15, wherein the persistent storage module is configured to store the refresh token to persist in a secure manner.

20. The system of claim 15, wherein the processor is further configured to obtain an application-specific cookie using the browser authentication cookie.

21. The system of claim 15, wherein the processor is further configured to determine that the browser authentication cookie has expired.

22. The system of claim 21, wherein the processor is further configured to:
based on the determination that the browser authentication cookie has expired, obtain a second browser authentication cookie using the access token; and
obtain an application-specific cookie using the access token, the refresh token, or both the access token and the refresh token, the application-specific cookie configured to store information related to the hybrid application.

23. The system of claim 15, wherein the processor is further configured to determine that the access token has expired.

24. The system of claim 23, wherein the processor is further configured to request, from an authentication server, a second access token using the refresh token.

25. The system of claim 15, wherein the processor is further configured to:
receive a second user credential from a second user account;
obtain a second access token and a second refresh token using the second user credential for a second user;
store the second refresh token to the persistent storage module;
exchange the second access token for a second browser authentication cookie;
authenticate the web application portion of the hybrid application using the second browser authentication cookie; and
merge the browser authentication cookie with the second browser authentication cookie.

26. The system of claim 15, wherein the processor is further configured to:
determine that the access token has expired;
provide the refresh token to an authentication server; and
obtain a second access token.

* * * * *